(12) United States Patent
Lee et al.

(10) Patent No.: US 7,990,642 B2
(45) Date of Patent: Aug. 2, 2011

(54) SYSTEMS AND METHODS FOR STORAGE CHANNEL TESTING

(75) Inventors: Yuan Xing Lee, San Jose, CA (US); George Mathew, San Jose, CA (US); Shaohua Yang, Santa Clara, CA (US); Hongwei Song, Longmont, CO (US); Weijun Tan, Longmont, CO (US); Hao Zhong, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 200 days.

(21) Appl. No.: 12/425,757

(22) Filed: Apr. 17, 2009

(65) Prior Publication Data

US 2010/0265608 A1      Oct. 21, 2010

(51) Int. Cl.
*G11B 27/36* (2006.01)
(52) U.S. Cl. ............................. 360/31; 324/212; 360/66
(58) Field of Classification Search ........................ None
See application file for complete search history.

(56) References Cited

U.S. PATENT DOCUMENTS

| | | | |
|---|---|---|---|
| 5,278,846 A | 1/1994 | Okayama et al. |
| 5,325,402 A | 6/1994 | Ushirokawa |
| 5,392,299 A | 2/1995 | Rhines et al. |
| 5,513,192 A | 4/1996 | Janku et al. |
| 5,612,964 A | 3/1997 | Haraszti |
| 5,701,314 A | 12/1997 | Armstrong et al. |
| 5,717,706 A | 2/1998 | Ikeda |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,097,764 A | 8/2000 | McCallister et al. |
| 6,216,251 B1 | 4/2001 | McGinn |
| 6,266,795 B1 | 7/2001 | Wei |
| 6,317,472 B1 | 11/2001 | Choi et al. |

(Continued)

FOREIGN PATENT DOCUMENTS

WO    WO 2006/016751    2/2006
WO    WO 2006/091797    8/2007

OTHER PUBLICATIONS

Casado et al., Multiple-rate low-density parity-check codes with constant blocklength, IEEE Transactions on Communications, Jan. 2009, vol. 57, pp. 75-83.

(Continued)

*Primary Examiner* — Jason C Olson
(74) *Attorney, Agent, or Firm* — Hamilton DeSanctis & Cha (57) ABSTRACT

Various embodiments of the present invention provide systems and methods for validating elements of storage devices. A an example, various embodiments of the present invention provide semiconductor devices that include a write path circuit, a read path circuit and a validation circuit. The write path circuit is operable to receive a data input and to convert the data input into write data suitable for storage to a storage medium. The read path circuit is operable to receive read data and to convert the read data into a data output. The validation circuit is operable to: receive the write data, augment the write data with a first noise sequence to yield a first augmented data series; and augment a derivative of the first augmented data series with a second noise sequence to yield the read data.

20 Claims, 5 Drawing Sheets

U.S. PATENT DOCUMENTS

| | | |
|---|---|---|
| 6,351,832 B1 | 2/2002 | Wei |
| 6,377,610 B1 | 4/2002 | Hagenauer et al. |
| 6,438,717 B1 | 8/2002 | Butler et al. |
| 6,473,878 B1 | 10/2002 | Wei |
| 6,625,775 B1 | 9/2003 | Kim |
| 6,671,404 B1 | 12/2003 | Katawani et al. |
| 6,748,034 B2 | 6/2004 | Hattori et al. |
| 6,757,862 B1 | 6/2004 | Marianetti |
| 6,788,654 B1 | 9/2004 | Hashimoto et al. |
| 6,810,502 B2 | 10/2004 | Eidson |
| 6,986,098 B2 | 1/2006 | Poeppelman |
| 7,010,051 B2 | 3/2006 | Murayama et al. |
| 7,047,474 B2 | 5/2006 | Rhee et al. |
| 7,058,873 B2 | 6/2006 | Song et al. |
| 7,093,179 B2 | 8/2006 | Shea |
| 7,184,486 B1 | 2/2007 | Wu et al. |
| 7,191,378 B2 | 3/2007 | Eroz et al. |
| 7,203,887 B2 | 4/2007 | Eroz et al. |
| 7,257,764 B2 | 8/2007 | Suzuki et al. |
| 7,310,768 B2 | 12/2007 | Eidson et al. |
| 2004/0098659 A1 | 5/2004 | Bjerke et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0248435 A1 | 11/2006 | Haratsch |
| 2007/0011569 A1 | 1/2007 | Casado et al. |
| 2007/0047635 A1 | 3/2007 | Stojanovic et al. |
| 2007/0286270 A1 | 12/2007 | Huang et al. |
| 2008/0049825 A1 | 2/2008 | Chen et al. |
| 2008/0168330 A1 | 7/2008 | Graef et al. |

OTHER PUBLICATIONS

Collins and Hizlan, "Determinate State Convolutional Codes" IEEE Transactions on Communications, Dec. 1993.

Eleftheriou, E. et al., "Low Density Parity Check Codes for Digital Subscriber Lines", Proc ICC 2002, pp. 1752-1757.

Han and Ryan, "Pinning Techniques for Low-Floor Detection/Decoding of LDPC-Coded Partial Response Channels", 5th International Symposium on Turbo Codes &Related Topics, 2008.

Mohsenin et al., "Split Row: A Reduced Complexity, High Throughput LDPC Decoder Architecture", pp. 1-6, printed from www.ece.ucdavis.edu on Jul. 9, 2007.

Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Yeo et al., "VLSI Architecture for Iterative Decoders in Magnetic Storage Channels", Mar. 2001, pp. 748-755, IEEE trans. Magnetics, vol. 37, No. 2.

Zhong et al., "Area-Efficient Min-Sum Decoder VLSI Architecture for High-Rate QC-LDPC Codes in Magnetic Recording", pp. 1-15, Submitted 2006, not yet published.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC TECHRON, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 20, 2007.

Zhong, "VLSI Architecture of LDPC Based Signal Detection and Coding System for Magnetic Recording Channel", Thesis, RPI, Troy, NY, pp. 1-95, May 2006.

Zhong, "Block-LDPC: A Practical LDPC Coding System Design Approach", IEEE Trans. On Circuits, Regular Papers, vol. 5, No. 4, pp. 766-775, Apr. 2005.

SYSTEMS AND METHODS FOR STORAGE CHANNEL TESTING

BACKGROUND OF THE INVENTION

The present inventions are related to systems and methods for verifying operation of storage systems, and more particularly to systems and methods for exercising a read channel device.

Figure 1A:
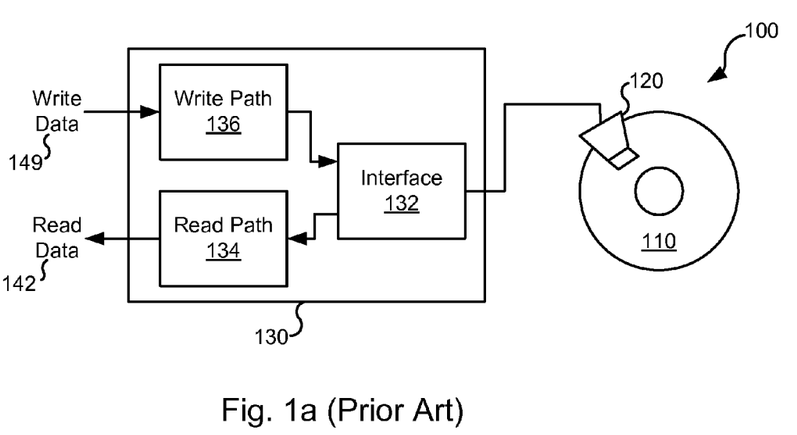
FIG. 1a depicts a prior art generalized hard disk drive system including a semiconductor device with a read and write paths.

Turning to FIG. 1a, a generalized hard disk drive system 100 is shown that includes a disk storage medium 110, a read/write head assembly 120 disposed in relation to disk storage medium 110, and a semiconductor device 130 that is electrically coupled to read/write head assembly 120 via an interface circuit 132. Interface circuit 132 provides data received from disk storage medium 110 to a read path circuit 134. Read path circuit 134 processes the received data and provides a read data output 142. A write data input 144 is provided to a write path circuit 136 that prepares the write data for storage on disk storage medium 110. The prepared data is provided to read/write head assembly 120 via interface circuit 132. The prepare data is then stored by read/write head assembly 120 to disk storage medium 110 as magnetic signals.

Testing such a hard disk drive system typically includes writing a test pattern introduced as write data 144 to disk storage medium 110, and subsequently reading the written pattern back as read data 142. The written pattern and read pattern may then be considered to determine whether disk drive system 100 is operating properly. This approach works reasonably well, however, it requires that semiconductor device 130 be assembled with other components of hard disk drive system 100 before testing can be completed. This does not allow testing at early development stages.

Figure 1B:
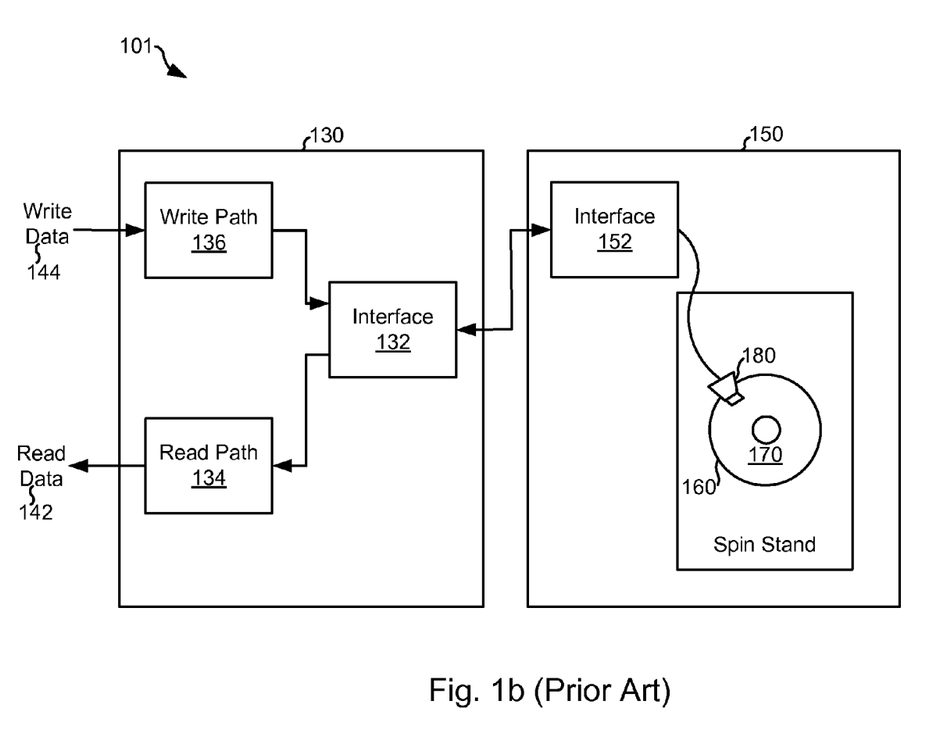

To overcome this inability to test semiconductor device 130 early in the design process, costly spin stands have been developed that are capable of operating a disk storage medium in relation to a read/write head assembly to allow for testing of semiconductor devices prior to inclusion in a hard disk drive system. Turning to FIG. 1b, a test system 101 is shown that includes a spin stand 150 that is electrically coupled to semiconductor device 130. In particular, spin stand 150 includes an interface circuit 152 that is capable of bidirectional communication with interface circuit 132. Spin stand 150 includes a spin system 160 that is capable of precise movement of a disk storage medium 170 in relation to a read/write head assembly 180. Spin stand 150 is able to simulate the operation of read/write head assembly 120 in relation to disk storage medium 110. As spin stand 150 may be used to test semiconductor device 130 before a prototype disk drive system has been completed, it offers an ability to generate reliable test information relatively early in the design process. Spin stand 150 is, however, a very expensive piece of equipment. As such, it may be either prohibitively costly or simply not available.

Hence, for at least the aforementioned reasons, there exists a need in the art for advanced systems and methods for verifying components of storage systems.

BRIEF SUMMARY OF THE INVENTION

The present inventions are related to systems and methods for verifying operation of storage systems, and more particularly to systems and methods for exercising a read channel device.

Various embodiments of the present invention provide semiconductor devices that include a write path circuit, a read path circuit and a validation circuit. The write path circuit is operable to receive a data input and to convert the data input into write data suitable for storage to a storage medium. The read path circuit is operable to receive read data and to convert the read data into a data output. The validation circuit is operable to: receive the write data, augment the write data with a first noise sequence to yield a first augmented data series; and augment a derivative of the first augmented data series with a second noise sequence to yield the read data. In some cases, the semiconductor device is deployed in a hard disk drive system. In such cases, the storage device is a disk platter in the hard disk drive system.

In some instances of the aforementioned embodiments, the validation circuit includes a noise generator circuit that generates the first noise sequence and the second noise sequence. In one or more instances of the aforementioned embodiments, the first noise sequence mimics position jitter caused by head-field and media during the write process of data to the storage medium, and the second noise sequence mimics electronics noise that is picked up during a read access to the storage medium.

In particular instances of the aforementioned embodiments, the derivative of the first augmented data series is identical to the first augmented data circuit. In such instances, the validation circuit may include: a noise generator circuit that generates the first noise sequence and the second noise sequence; a transition jitter augmentation circuit that adds the first noise sequence to the write data to yield the first augmented data series; and an electronics noise augmentation circuit that adds the second noise sequence to the first augmented data series to yield the read data. In one or more instances of the aforementioned embodiments, the validation circuit includes: a noise generator circuit that generates the first noise sequence and the second noise sequence; a transition jitter augmentation circuit that adds the first noise sequence to the write data to yield the first augmented data series; a channel model circuit that modifies the first augmented data series to yield the derivative of the first augmented data series; and an electronics noise augmentation circuit that adds the second noise sequence to the derivative of the first augmented data series to yield the read data. In some such instances, the channel model circuit mimics the impulse response of a read/write head assembly used for transferring data to and from the storage medium. In particular cases, the channel model circuit implements a Gaussian error function. In one or more instances of the aforementioned embodiments, the semiconductor device is deployed in a hard disk drive system. In such instances, the storage device is a disk platter in the hard disk drive system, and the read/write head assembly is disposed in relation to the disk platter.

Other embodiments of the present invention provide methods for validating a read channel semiconductor device. The methods include providing a write path circuit, a read path circuit, a validation circuit, and a data input. The data input is converted in the write path circuit into write data suitable for storage to a storage medium. The write data is augmented with a first noise sequence in the validation circuit to yield a first augmented data series. A derivative of the first augmented data series is augmented with a second noise sequence in the validation circuit to yield the read data. The read data is converted in the read path circuit to yield a data output. In some instances of the aforementioned embodiments, the first noise sequence mimics position jitter caused by head-field and media during the write process of data to the storage medium, and the second noise sequence mimics electronics noise that is picked up during a read access to the storage medium.

In one or more instances of the aforementioned embodiments, the methods further include augmenting the first augmented data series using a channel model circuit to yield the derivative of the first augmented data series. In some such instances, the channel model circuit mimics the impulse response of a read/write head assembly used for transferring data to and from the storage medium. The channel model circuit may implement a Gaussian error function.

Yet other embodiments of the present invention provide storage device simulation circuits. Such circuits include a noise generator circuit that generates the first noise sequence and the second noise sequence; a transition jitter augmentation circuit that adds the first noise sequence to a write data to yield the first augmented data series, and wherein the write data is a data set suitable for storage to a storage medium; a channel model circuit that modifies the first augmented data series to yield the derivative of the first augmented data series; and an electronics noise augmentation circuit that adds the second noise sequence to the derivative of the first augmented data series to yield a read data.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b depicts a prior art spin stand incorporated in a test system that is capable of verifying the operation of the semiconductor device of FIG. 1a;

DETAILED DESCRIPTION OF THE INVENTION

The present inventions are related to systems and methods for verifying operation of storage systems, and more particularly to systems and methods for exercising a read channel device.

Figure 2:
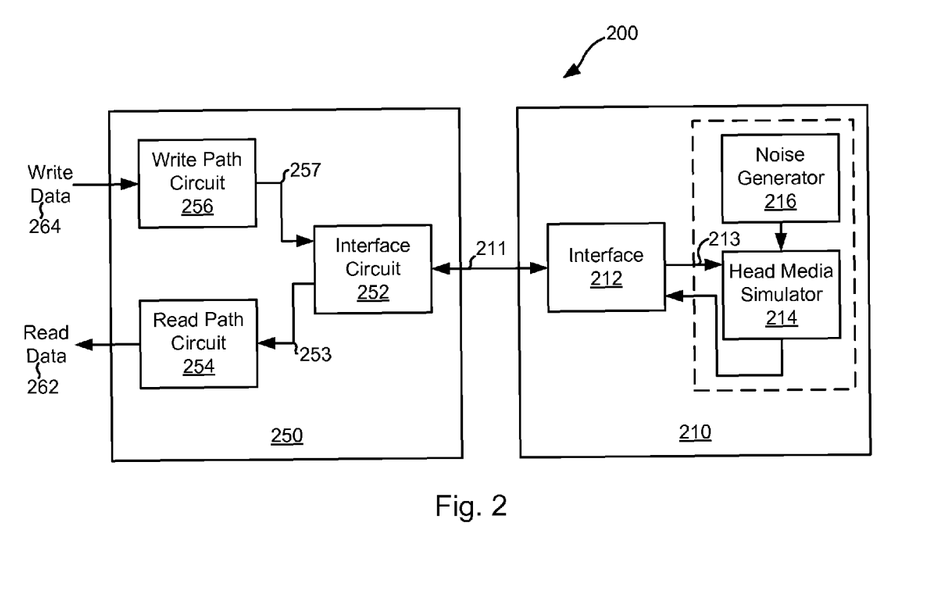
FIG. 2 shows a storage device test system that includes a storage medium replication circuit in accordance with different embodiments of the present invention.

Turning to FIG. 2, a storage device test system 200 including a storage medium replication circuit 210 is shown in accordance with different embodiments of the present invention. Storage device test system 200 includes a read/write semiconductor device 250 and a separate simulation semiconductor device 210 that are electrically coupled via a input/output 211. Read/write semiconductor device 250 may be any semiconductor device or circuits known in the art that are capable of transferring information to/from a storage medium (not shown) via a read/write head assembly (not shown). Read/write semiconductor device 250 includes an interface circuit 252. Interface circuit 252 provides read data 253 to a read path circuit 254. Read path circuit 254 may be any data processing circuit known in the art that is capable of receiving information derived from a storage medium, and processing the received information into a read data output 262. Based upon the disclosure provided herein, one of ordinary skill in the art will recognize a variety of read path circuits that may be used in relation to different embodiments of the present invention. A write data input 264 is provided to a write path circuit 256 that prepares data received via write data input 264 for writing to a storage medium. Write path circuit 256 provides write data 257 to input/output 211 via interface 252. Write path circuit 256 may be any data processing circuit known in the art that is capable of receiving information to be stored on a storage medium, and processing the data in preparation for storage on the storage medium. It should be noted that in some embodiments of the present invention, read/write semiconductor device 250 may be incorporated in a semiconductor device including other functional circuits. In such cases, write data input 264 and read data output 262 may be attached to interfaces of such other functional circuits.

Simulation semiconductor device 210 is designed to exercise read/write semiconductor device 250 without necessarily requiring a storage medium and/or sophisticated mechanical systems designed to exercise the storage medium. As such, simulation semiconductor device 210 allows for transfer of information to/from read/write semiconductor device 250 via an interface circuit 212. In addition to interface circuit 212, simulation semiconductor device 210 includes a noise generator circuit 216 and a head media simulation circuit 214. Interface circuit 212 provides write data 213 (i.e., data that would be directed to a disk storage medium when read/write semiconductor device 250 is deployed) to head media simulation circuit 214. Interface circuit 212 receives read data 215 (i.e., data that would be obtained from a storage medium when read/write semiconductor device 250 is deployed) from head media simulation circuit 214.

In operation, a test pattern is introduced via write data input 264. The test data is processed by write path circuit 256 as if it was to be written to a storage medium. The resulting write data 257 is provided to input/output 211 via interface circuit 252. The write data is received by interface circuit 212 that provides it as write data 213 to head media simulation circuit 214. As more fully described below, head media simulation circuit 214 accepts the received information and modifies the information consistent with what would be expected if the data was written to and read back from a storage medium. As part of this, head media simulation circuit 214 adds one or more noise components generated by noise generator circuit 216 to the received information.

The modified write information is then provided to input/output 211 via interface circuit 212 as read data 215. Interface 252 receives the read data and provides it as read data 253 to read path circuit 254. Read path circuit 254 processes read data 253, and provides the processed data via read data output 262. The data received via read data output 262 may be compared to the data pattern originally provided via write data input 264. Based upon this comparison and/or other processes using the data received via read data output 262, meaningful information about the operation of read/write semiconductor device 250 can be developed. Of note, using the data received via read data output 262 to determine functional status of read/write semiconductor device 250 is well known in the art, and based upon the disclosure provided herein, one of ordinary skill in the art will appreciate a variety of uses for the data received via read data output 262.

Various advantages can be achieved through use of embodiments of the present invention. For example, some embodiment of the present invention provide for verification a relatively high data rates compared with previous approaches for data path verification. Further, verification using embodiments of one or more embodiments of the present invention is less expensive when compared with use of spin stands for verification. Further, one or more embodiments of the present invention do not require design delay while a disk drive system is developed in which the semiconductor device is tested. Based upon the disclosure provided herein, one of ordinary skill in the art will recognize a variety of other advantages that may be achieved through implementations of different embodiments of the present invention.

Figure 3:
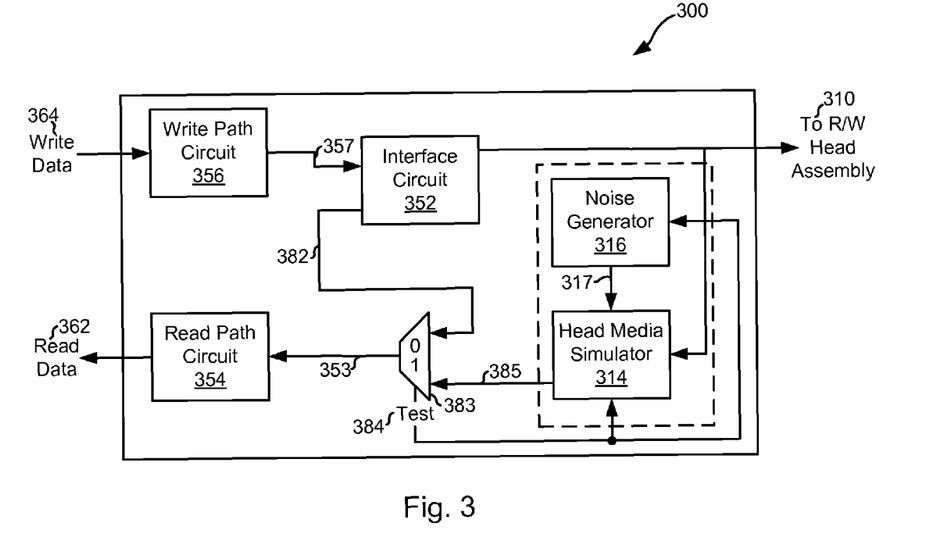
FIG. 3 shows a read/write semiconductor device including an on-board test system in accordance with different embodiments of the present invention.

Turning to FIG. 3, a read/write semiconductor device 300 including an on-board test system is shown in accordance with different embodiments of the present invention. Read/write semiconductor device 300 includes a write data input 364, a read data output 362, and a storage side input/output 310. Write data input 364 is provided to a write path circuit 356, and read data output 362 is provided from a read path circuit 354. Write path circuit 356 provides write data 357 to storage side input/output 310 via an interface circuit 352. Write path circuit 356 may be any data processing circuit known in the art that is capable of receiving information to be stored on a storage medium, and processing the data in preparation for storage on the storage medium. Based upon the disclosure provided herein, one of ordinary skill in the art will recognize a variety of implementations of write path circuit 356 that may be used in relation to different embodiments of the present invention. Additionally, interface circuit 352 provides data received from storage side input/output 310 as read data 382 to a multiplexer circuit 383.

A head media simulation circuit 314 receives write data directed to storage side input/output 310. Head media simulation circuit 314 receives the write data and modifies it to appear as if it had been retrieved from a disk storage medium (not shown). This includes modifying the write data using various noise components 317 generated by a noise generator circuit 316. Head media simulation circuit 314 provides the modified write data a read test data 385. Noise generator circuit 316 and head media simulation circuit 314 can be turned off whenever a selectable test input 384 is de-asserted.

Multiplexer circuit 383 provides either read data 382 or read test data 385 as read data 353 depending upon the assertion level of selectable test input 384. Read data 353 is provided to a read path circuit 354 that processes it and provides the processed data via read data output 362. Read path circuit 354 may be any data processing circuit known in the art that is capable of receiving information derived from a storage medium, and processing the received information into a read data output 262. Based upon the disclosure provided herein, one of ordinary skill in the art will recognize a variety of read path circuits that may be used in relation to different embodiments of the present invention. It should be noted that in some embodiments of the present invention, read/write semiconductor device 300 may be incorporated in a semiconductor device including other functional circuits. In such cases, write data input 364 and read data output 362 may be attached to interfaces of such other functional circuits.

In operation, a test pattern is introduced via write data input 364. The test data is processed by write path circuit 356 as if it was to be written to a storage medium. The resulting write data 357 is provided to storage side input/output 310. When selectable test input 384 is de-asserted, the write data is provided as an output to a storage medium (not shown). In contrast, when selectable test input 384 is asserted, the write data is also provided to head media simulation circuit 314. As more fully described below, head media simulation circuit 314 accepts the received information and modifies the information consistent with what would be expected if the data was written to and read back from a storage medium. As part of this, head media simulation circuit 314 adds one or more noise components 317 generated by noise generator circuit 316.

The modified write information is provided as read test data 385 to multiplexer 383. As selectable test input 384 is asserted, multiplexer 383 provides read test data 385 as read data 353 to read path circuit 354. Read path circuit 354 processes read data 353, and provides the processed data via read data output 362. The data received via read data output 362 may be compared to the data pattern originally provided via write data input 364. Based upon this comparison and/or other processes using the data received via read data output 362, meaningful information about the operation of read/write semiconductor device 300 can be derived. Of note, using the data received via read data output 362 to determine functional status of read/write semiconductor device 300 is well known in the art, and based upon the disclosure provided herein, one of ordinary skill in the art will appreciate a variety of uses for the data received via read data output 362.

Various advantages can be achieved through use of embodiments of the present invention. For example, some embodiment of the present invention provide for verification a relatively high data rates compared with previous approaches for data path verification. Further, verification using embodiments of one or more embodiments of the present invention is less expensive when compared with use of spin stands for verification. Further, one or more embodiments of the present invention do not require design delay while a disk drive system is developed in which the semiconductor device is tested. Yet further, various embodiments of the present invention provide a self contained test loop that may be used after manufacture for debugging purposes. Based upon the disclosure provided herein, one of ordinary skill in the art will recognize a variety of other advantages that may be achieved through implementations of different embodiments of the present invention.

Figure 4A:
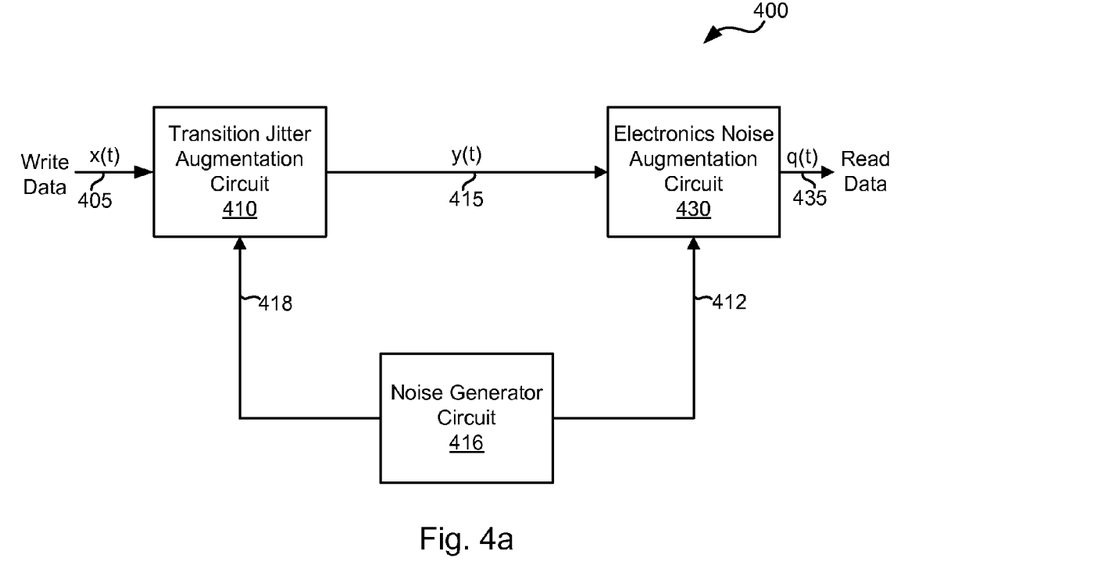
FIG. 4a shows a simulation circuit in accordance with various embodiments of the present invention.

Turning to FIG. 4a, a simulation circuit 400 in accordance with various embodiments of the present invention is shown. Of note, simulation circuit 400 may be used in relation to either or both of storage device test system 200 and read/write semiconductor device 300. In particular, where simulation circuit 400 is used in relation to storage device test system 200, it may be used in place of noise generator circuit 216 and head media simulation circuit 214. Where simulation circuit 400 is used in relation to read/write semiconductor device 300, it may be used in place of noise generator circuit 316 and head media simulation circuit 314.

Simulation circuit 400 receives a write data input 405 ($x(t)$) at a transition jitter augmentation circuit 410. Transition jitter augmentation circuit 410 augments write data input 405 by noise sequences 418 generated by noise generator circuit 416 to yield a jitter augmented output 415 ($y(t)$). In some embodiments of the present invention, noise generator circuit 416 is a Gaussian noise generator as is known in the art. Noise generator circuit 416 generates noise sequences 418. Noise sequences 418 mimic position jitter caused by head-field and media during the write process of data to a storage medium. In some embodiments of the present invention, noise generator circuit 416 is programmable such that it allows for selection of a variety of noise sequences 418 capable of mimicking a variety of jitter scenarios.

Jitter augmented output 415 is provided to an electronics noise augmentation circuit 430. Electronics noise augmentation circuit 430 augments jitter augmented output 415 by a noise sequence 412 generated by noise generator circuit 416 to yield a read data output 435 (q(t)). The addition of noise sequence 412 mimics electronics noise that is picked up during the read process. In some embodiments of the present invention, noise generator circuit 416 is programmable such that it allows for selection of a variety of noise sequences 412 capable of mimicking a variety of electronics noise scenarios. Read data output 435 mimics the signal that would be derived where write data input 405 is written to a storage medium via a read/write head assembly, and subsequently read back from the storage medium using the same read/write head assembly.

Figure 4B:
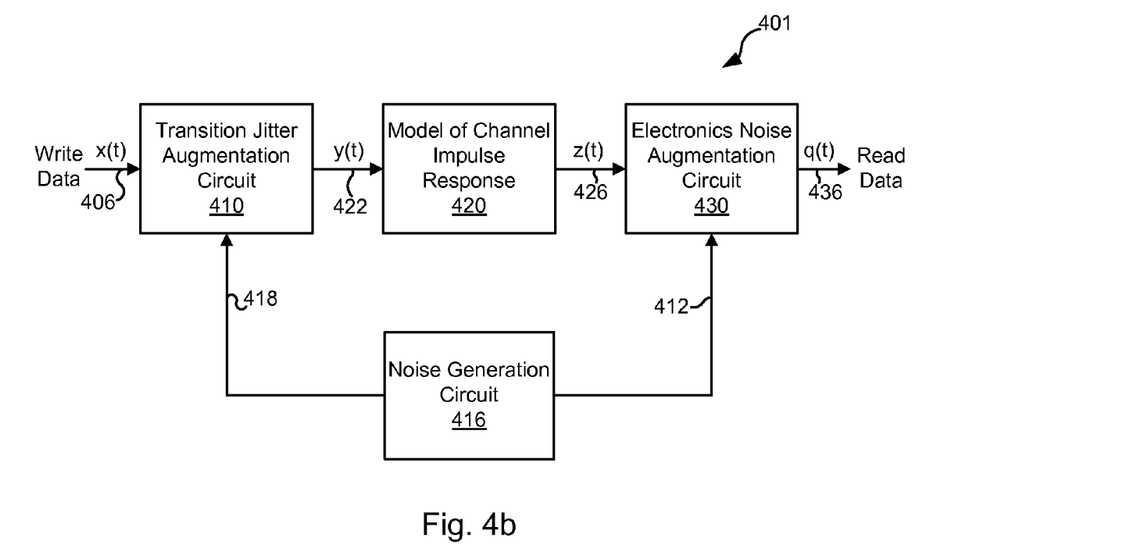
FIG. 4b shows another simulation circuit in accordance with other embodiments of the present invention.

Turning to FIG. 4b, a simulation circuit 401 in accordance with various embodiments of the present invention is shown. Of note, simulation circuit 401 may be used in relation to either or both of storage device test system 200 and read/write semiconductor device 300. In particular, where simulation circuit 401 is used in relation to storage device test system 200, it may be used in place of noise generator circuit 216 and head media simulation circuit 214. Where simulation circuit 401 is used in relation to read/write semiconductor device 300, it may be used in place of noise generator circuit 316 and head media simulation circuit 314.

Simulation circuit 401 receives a write data input 406 (x(t)) at a transition jitter augmentation circuit 410. Transition jitter augmentation circuit 410 augments write data input 406 by noise sequences 418 generated by noise generator circuit 416 to yield a jitter augmented output 422 (y(t)). Again, in some embodiments of the present invention, noise generator circuit 416 is a Gaussian noise generator as is known in the art. Noise generator circuit 416 generates noise sequences 418 that mimic position jitter caused by head-field and media during the write process of data to a storage medium. Again, in some embodiments of the present invention, noise generator circuit 416 is programmable such that it allows for selection of a variety of noise sequences 418 capable of mimicking a variety of jitter scenarios.

Jitter augmented output 422 is provided to a channel model circuit 420 that is designed to model the impulse response of a head media. Channel model circuit 420 modifies jitter augmented output 422 to reflect a channel impulse response and provides an impulse response output 426 (z(t)). Channel model circuit 420 mimics the impulse response of a read/write head assembly that would be used for transferring data to/from a medium. In one particular embodiment of the present invention, channel model circuit 420 is a circuit that implements a Gaussian error function (erf(x)) as are known in the art. As one example, the implemented error function may be expressed as the following equation:

$$\mathrm{erf}(x) = \frac{2}{\sqrt{\pi}} \int_0^x e^{-t^2} dt.$$

Based upon the disclosure provided herein, one of ordinary skill in the art will recognize a variety of channel models that may be implemented and incorporated as channel model circuit 420. In some embodiments of the present invention, one or more parameters of channel model circuit 420 may be programmable such that a variety of read/write head assemblies can be simulated through control of the parameters.

Impulse response output 426 is provided to an electronics noise augmentation circuit 430. Electronics noise augmentation circuit 430 augments impulse response output 426 by a noise sequence 412 generated by noise generator circuit 416 to yield a read data output 436 (q(t)). The addition of noise sequence 412 mimics electronics noise that is picked up during the read process. In some embodiments of the present invention, noise generator circuit 416 is programmable such that it allows for selection of a variety of noise sequences 412 capable of mimicking a variety of electronics noise scenarios. Read data output 436 mimics the signal that would be derived where write data input 406 is written to a storage medium via a read/write head assembly, and subsequently read back from the storage medium using the same read/write head assembly.

Based upon the disclosure provided herein, one of ordinary skill in the art will appreciate a variety of advantages that may be achieved through use of the simulation circuits of FIGS. 4a-4b. For example, such simulation circuits provide an ability to do self validation where the simulation circuits are incorporated with a read channel semiconductor device similar to that discussed above in relation to FIG. 3. Such self validation allows for validation of both read path circuits and write path circuits in a read channel semiconductor device without having to resort to architectural waveforms or real head-media waveforms. This self validation ability allows for verification at data rates that would be expected by the read channel semiconductor device, and is much less costly and time consuming than use of current spin stand technology. In particular, a complete validation of a write path circuit of a read channel semiconductor device can be achieved before the read channel semiconductor device is incorporated into a hard disk drive or other storage system. Further, inclusion of such simulation circuits either into the read channel semiconductor device or use in relation to the read channel semiconductor device may obviate the need to rely on costly spin stand technology. Further, when compared with existing spin stand technology, simulation results may be achieved much earlier in the design process, allowing for more efficient design of read channel devices. Further, one or more parameters of noise generator circuit 416 and/or channel model circuit 420 parameters may be programmable to allow for validation of the read channel semiconductor device in relation to a variety of different noise and/or hardware scenarios. Based upon the disclosure provided herein, one of ordinary skill in the art will recognize a variety of other advantages that may be achieved through use of the simulation circuits discussed in relation to FIGS. 4a-4b.

Figure 5:
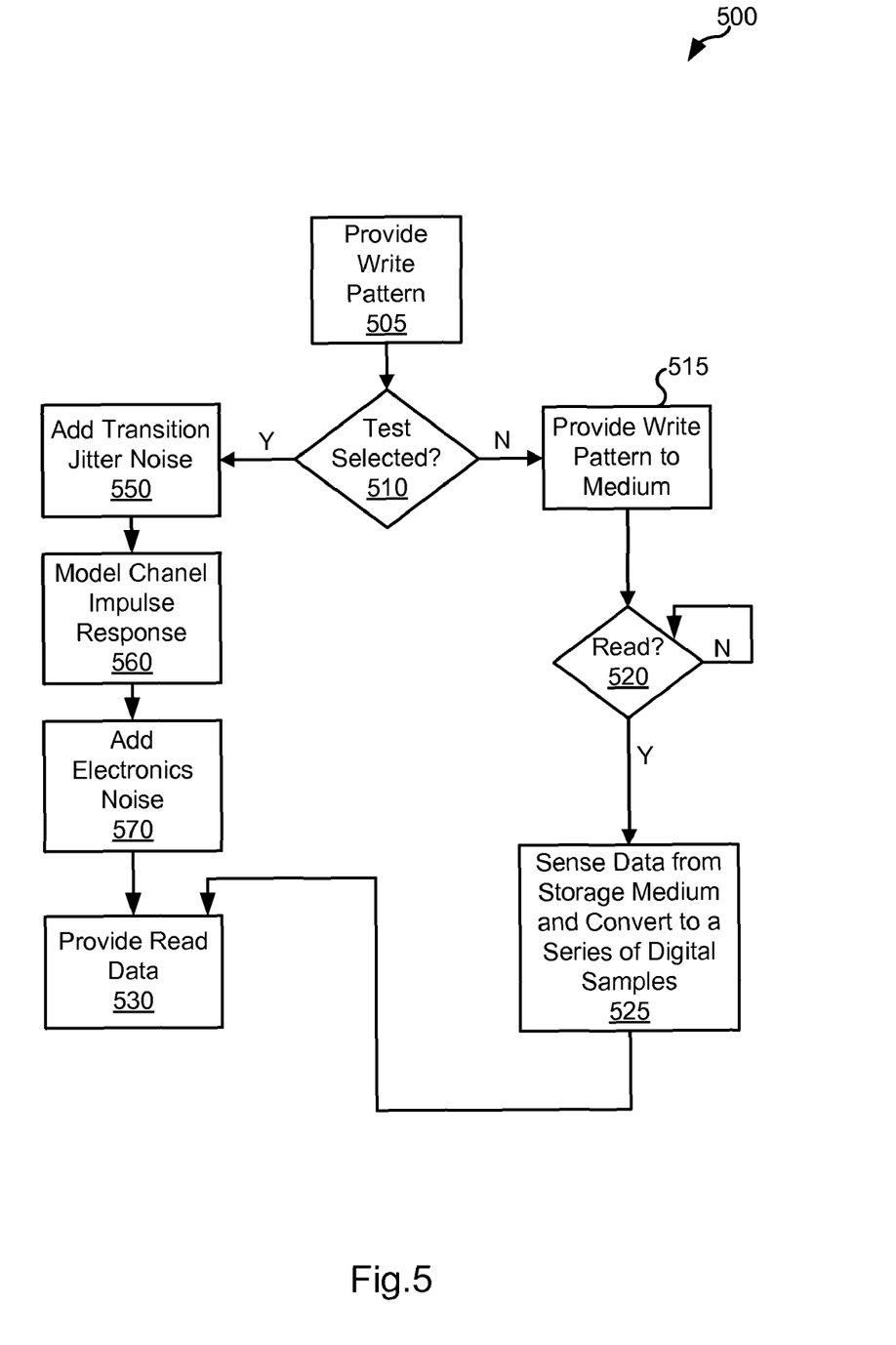
FIG. 5 is a flow diagram showing a method in accordance with one or more embodiments of the present invention for verifying read channel devices.

Turning to FIG. 5, a flow diagram 500 shows a method in accordance with one or more embodiments of the present invention for verifying read channel devices. Following flow diagram 500, a write pattern is provided (block 505). Write data is provided via a write data input and may include a series of binary values that are to be stored to a storage medium. In some cases, the write data may include a variety of encoding preparatory to writing to a storage medium. Based upon the disclosure provided herein, one of ordinary skill in the art will recognize a variety of write data that may be introduced. It is determined whether a device test is selected (block 510). A device test may be selected, for example, by asserting a test enable signal. The test enable signal may be either an external pin to the device being tested, or may be programmably asserted by setting one or more register bits internal to the device being tested.

Where a device test is not selected (block 510), the write data is processed and provided to the storage medium (block 515). This may be done using any write processes known in the art. For example, the write data may be converted to an analog signal that is provided to a read/write head assembly that is disposed in relation to the storage medium. The read/write head assembly generates a time varying magnetic field that is stored to the storage medium. It is then determined whether the data is to be read back from the storage medium (block 520), Where the data is to be read back from the storage medium (block 520), the data is sensed from the storage medium and converted to a series of digital samples (block 525). The series of digital samples are provided to a read path circuit as read data (block 530).

Alternatively, where a device test is not selected (block 510), the write data is provided to a test path. The test path may be, for example, similar to one of simulation circuits 400, 401 as discussed above in relation to FIGS. 4a-4b. Transition jitter noise is added to the write data (block 550). The added transition jitter noise may be a Gaussian noise sequence that mimics position jitter caused by head-field and media during the write process of data to a storage medium. Next, a channel impulse response is applied to the jitter noise augmented write data (block 560). Such a process mimics any changes to the data caused by a read/write head assembly that would be used for transferring data to/from a medium. Electronics noise is added to the resulting impulse response modified data (block 570). The added electronics noise may be a Gaussian noise sequence that mimics electronics noise that is picked up during the read process. The noise augmented write data is then provided to a read path circuit as read data (block 530).

Figure 6:
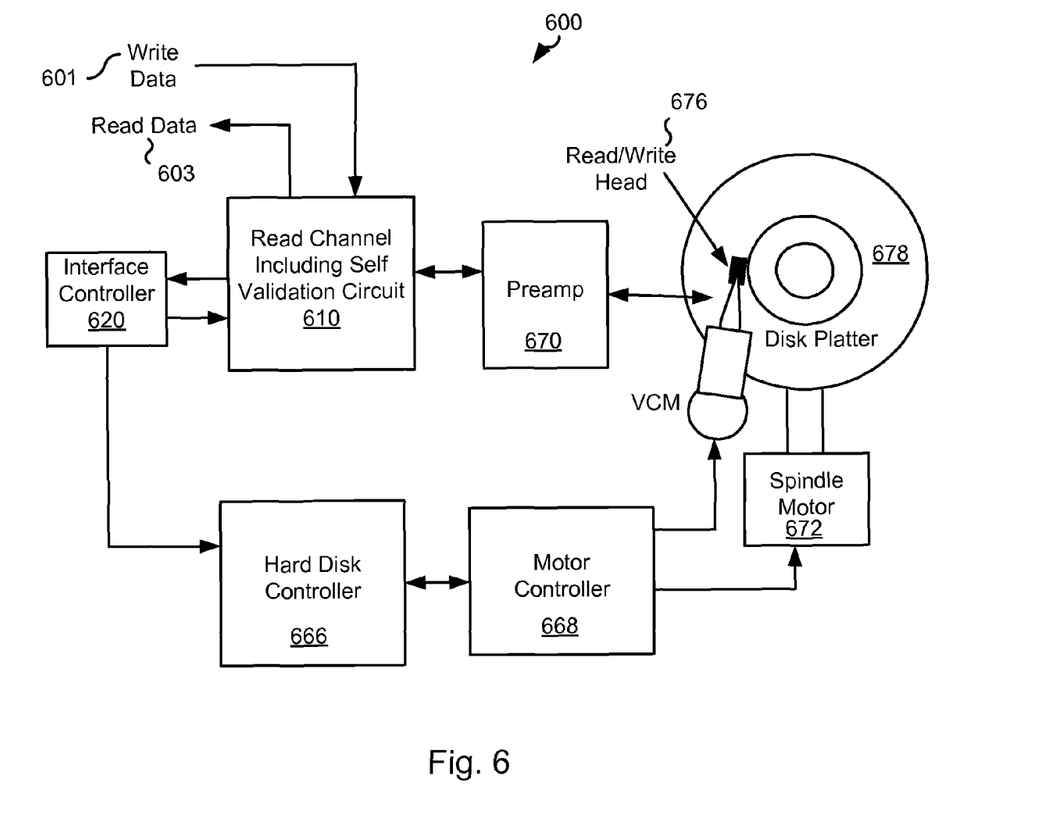
FIG. 6 shows a storage system with a read channel circuit including a self validation circuit in accordance with various embodiments of the present invention.

Turning to FIG. 6, a storage system 600 including a read channel circuit 610 with a self validation circuit in accordance with various embodiments of the present invention. Storage system 600 may be, for example, a hard disk drive. The self validation circuit may be, but is not limited to, that discussed in relation to FIGS. 3, 4a and 4b. In some cases, the self validation included as part of read channel 610 may operate using the method described above in relation to FIG. 5.

Storage system 600 also includes a preamplifier 670, an interface controller 620, a hard disk controller 666, a motor controller 668, a spindle motor 672, a disk platter 678 (i.e., a storage medium), and a read/write head assembly 676. Interface controller 620 controls addressing and timing of data to/from disk platter 678. The data on disk platter 678 consists of groups of magnetic signals that may be detected by read/write head assembly 676 when the assembly is properly positioned over disk platter 678. In one embodiment, disk platter 678 includes magnetic signals recorded in accordance with a perpendicular recording scheme. For example, the magnetic signals may be recorded as either longitudinal or perpendicular recorded signals.

In a typical read operation, read/write head assembly 676 is accurately positioned by motor controller 668 over a desired data track on disk platter 678. The appropriate data track is defined by an address received via interface controller 620. Motor controller 668 both positions read/write head assembly 676 in relation to disk platter 678 and drives spindle motor 672 by moving read/write head assembly to the proper data track on disk platter 678 under the direction of hard disk controller 666. Spindle motor 672 spins disk platter 678 at a determined spin rate (RPMs). Once read/write head assembly 678 is positioned adjacent the proper data track, magnetic signals representing data on disk platter 678 are sensed by read/write head assembly 676 as disk platter 678 is rotated by spindle motor 672. The sensed magnetic signals are provided as a continuous, minute analog signal representative of the magnetic data on disk platter 678. This minute analog signal is transferred from read/write head assembly 676 to read channel module 610 via preamplifier 670. Preamplifier 670 is operable to amplify the minute analog signals accessed from disk platter 678. In turn, read channel module 610 decodes and digitizes the received analog signal to recreate the information originally written to disk platter 678. A write operation is substantially the opposite of the preceding read operation with write data 601 being provided to read channel module 610. This data is then encoded and written to disk platter 678.

In conclusion, the invention provides novel systems, devices, methods and arrangements for exercising read channel devices. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A semiconductor device, the device comprising:
   a write path circuit, wherein the write path circuit is operable to receive a data input and to convert the data input into write data suitable for storage to a storage medium;
   a read path circuit, wherein the read path circuit is operable to receive read data and to convert the read data into a data output;
   a validation circuit, wherein the validation circuit is operable to:
   receive the write data,
   augment the write data with a first noise sequence to yield a first augmented data series; and
   augment a derivative of the first augmented data series with a second noise sequence to yield the read data.

2. The semiconductor device of claim 1, wherein the validation circuit includes:
   a noise generator circuit, wherein the noise generator circuit is operable to generate the first noise sequence and the second noise sequence.

3. The semiconductor device of claim 1, wherein the first noise sequence mimics position jitter caused by head-field and media during the write process of data to the storage medium.

4. The semiconductor device of claim 1, wherein the second noise sequence mimics electronics noise that is picked up during a read access to the storage medium.

5. The semiconductor device of claim 1, wherein the derivative of the first augmented data series is the first augmented data series, and wherein the validation circuit includes:
   a noise generator circuit, wherein the noise generator circuit is operable to generate the first noise sequence and the second noise sequence;
   a transition jitter augmentation circuit, wherein the transition jitter augmentation circuit is operable to add the first noise sequence to the write data to yield the first augmented data series; and
   an electronics noise augmentation circuit, wherein the electronics noise augmentation circuit is operable to add the second noise sequence to the first augmented data series to yield the read data.

6. The semiconductor device of claim 1, wherein the validation circuit includes:
a noise generator circuit, wherein the noise generator circuit is operable to generate the first noise sequence and the second noise sequence;
a transition jitter augmentation circuit, wherein the transition jitter augmentation circuit is operable to add the first noise sequence to the write data to yield the first augmented data series;
a channel model circuit, wherein the channel model circuit is operable to modify the first augmented data series to yield the derivative of the first augmented data series; and
an electronics noise augmentation circuit, wherein the electronics noise augmentation circuit is operable to add the second noise sequence to the derivative of the first augmented data series to yield the read data.

7. The semiconductor device of claim 6, wherein the channel model circuit is operable to mimic the impulse response of a read/write head assembly used for transferring data to and from the storage medium.

8. The semiconductor device of claim 7, wherein channel model circuit implements a Gaussian error function.

9. The semiconductor device of claim 6, wherein the semiconductor device is deployed in a hard disk drive system, wherein the storage device is a disk platter in the hard disk drive system, and wherein the read/write head assembly is disposed in relation to the disk platter.

10. The semiconductor device of claim 1, wherein the semiconductor device is deployed in a hard disk drive system, and wherein the storage device is a disk platter in the hard disk drive system.

11. A method for validating a read channel semiconductor device, the method comprising:
providing a write path circuit;
providing a read path circuit;
providing a validation circuit;
providing a data input;
converting the data input in the write path circuit into write data suitable for storage to a storage medium;
augmenting the write data with a first noise sequence in the validation circuit to yield a first augmented data series;
augmenting a derivative of the first augmented data series with a second noise sequence in the validation circuit to yield the read data; and
converting the read data in the read path circuit to yield a data output.

12. The method of claim 11, wherein the first noise sequence mimics position jitter caused by head-field and media during the write process of data to the storage medium.

13. The method of claim 11, wherein the second noise sequence mimics electronics noise that is picked up during a read access to the storage medium.

14. The method of claim 11, wherein the methods further comprises:
augmenting the first augmented data series using a channel model circuit to yield the derivative of the first augmented data series.

15. The method of claim 14, wherein the channel model circuit mimics the impulse response of a read/write head assembly used for transferring data to and from the storage medium.

16. The method of claim 14, wherein channel model circuit implements a Gaussian error function.

17. A storage device simulation circuit, the circuit comprising:
a noise generator circuit, wherein the noise generator circuit is operable to generate a first noise sequence and a second noise sequence;
a transition jitter augmentation circuit, wherein the transition jitter augmentation circuit is operable to add the first noise sequence to a write data to yield the first augmented data series, and wherein the write data is a data set suitable for storage to a storage medium;
a channel model circuit, wherein the channel model circuit is operable to modify the first augmented data series to yield the derivative of the first augmented data series; and
an electronics noise augmentation circuit, wherein the electronics noise augmentation circuit is operable to add the second noise sequence to the derivative of the first augmented data series to yield a read data.

18. The circuit of claim 17, wherein the channel model circuit mimics the impulse response of a read/write head assembly used for transferring data to and from the storage medium.

19. The circuit of claim 18, wherein the circuit is deployed in read channel device of a hard disk drive system, wherein the storage device is a disk platter in the hard disk drive system, and wherein the read/write head assembly is disposed in relation to the disk platter.

20. The circuit of claim 17, wherein the first noise sequence mimics position jitter caused by head-field and media during the write process of data to the storage medium, and wherein the second noise sequence mimics electronics noise that is picked up during a read access to the storage medium.

* * * * *